(12) United States Patent
Johnson et al.

(10) Patent No.: US 11,976,562 B2
(45) Date of Patent: May 7, 2024

(54) SYSTEM FOR CONTROLLING BLADE CLEARANCES WITHIN A GAS TURBINE ENGINE

(71) Applicant: General Electric Company, Schenectady, NY (US)

(72) Inventors: Steven Douglas Johnson, Milford, OH (US); Julius John Montgomery, Mason, OH (US); Brandon Wayne Miller, Liberty Township, OH (US); Robert Proctor, Mason, OH (US); Bradley W. Fintel, West Chester, OH (US); Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/297,835

(22) Filed: Apr. 10, 2023

(65) Prior Publication Data
US 2023/0265764 A1 Aug. 24, 2023

Related U.S. Application Data

(62) Division of application No. 17/142,357, filed on Jan. 6, 2021, now abandoned.

(51) Int. Cl.
*F01D 11/24* (2006.01)
*F01D 5/03* (2006.01)
(Continued)

(52) U.S. Cl.
CPC ............... *F01D 11/24* (2013.01); *F01D 5/03* (2013.01); *F01D 11/18* (2013.01); *F02C 6/08* (2013.01);
(Continued)

(58) Field of Classification Search
CPC . F01D 5/03; F01D 5/082; F01D 5/081; F01D 11/24; F01D 11/18; F02C 6/08; F02C 7/185
See application file for complete search history.

(56) References Cited

U.S. PATENT DOCUMENTS

| 2,582,842 A | 1/1952 | Messinger |
| 3,895,243 A | 7/1975 | Amend et al. |

(Continued)

FOREIGN PATENT DOCUMENTS

| EP | 2003311 A2 | 12/2008 |
| EP | 3018304 A1 | 5/2016 |

(Continued)

*Primary Examiner* — Andrew H Nguyen
(74) *Attorney, Agent, or Firm* — Dority & Manning, P.A.

(57) ABSTRACT

A system for controlling blade clearances within a gas turbine engine includes a rotor disk and a rotor blade coupled to the rotor disk. Additionally, the system includes an outer turbine component positioned outward of the rotor blade such that a clearance is defined between the rotor blade and the outer turbine component. Furthermore, the system includes a heat exchanger configured to receive a flow of cooling air bled from the gas turbine engine and transfer heat from the received flow of the cooling air to a flow of coolant to generate cooled cooling air. Moreover, the system includes a valve configured to control the flow of the coolant to the heat exchanger. In this respect, the cooled cooling air is supplied to at least one of the rotor disk or the rotor blade to adjust the clearance between the rotor blade and the outer turbine component.

20 Claims, 6 Drawing Sheets

(51) Int. Cl.
  *F01D 11/18* (2006.01)
  *F02C 6/08* (2006.01)
  *F02C 7/18* (2006.01)
  *F01D 25/12* (2006.01)
  *F01D 25/14* (2006.01)

(52) U.S. Cl.
  CPC .............. *F02C 7/185* (2013.01); *F01D 25/12* (2013.01); *F01D 25/14* (2013.01); *F05D 2220/323* (2013.01); *F05D 2240/11* (2013.01); *F05D 2240/55* (2013.01); *F05D 2260/20* (2013.01); *F05D 2260/30* (2013.01)

(56) References Cited

U.S. PATENT DOCUMENTS

| | | | |
|---|---|---|---|
| 3,989,410 A | 11/1976 | Ferrari | |
| 4,505,124 A | 3/1985 | Mayer | |
| 4,550,573 A | 11/1985 | Rannenberg | |
| 4,773,212 A | 9/1988 | Griffin et al. | |
| 5,149,018 A | 9/1992 | Clark | |
| 5,341,636 A | 8/1994 | Paul | |
| 5,667,168 A | 9/1997 | Fluegel | |
| 5,722,241 A | 3/1998 | Huber | |
| 5,724,806 A | 3/1998 | Homer | |
| 6,106,229 A | 8/2000 | Nikkanen et al. | |
| 6,182,435 B1 | 2/2001 | Niggemann et al. | |
| 6,250,097 B1 | 6/2001 | Lui et al. | |
| 6,415,595 B1 | 7/2002 | Wilmot, Jr. et al. | |
| 6,435,454 B1 | 8/2002 | Engelhardt | |
| 6,626,635 B1 | 9/2003 | Prowse et al. | |
| 6,701,717 B2 | 3/2004 | Flatman et al. | |
| 7,260,926 B2 | 8/2007 | Sabatino et al. | |
| 7,377,098 B2 | 5/2008 | Walker et al. | |
| 7,395,657 B2 | 7/2008 | Johnson | |
| 7,398,641 B2 | 7/2008 | Stretton et al. | |
| 7,836,680 B2 | 11/2010 | Schwarz et al. | |
| 7,882,704 B2 | 2/2011 | Chen | |
| 7,966,807 B2 | 6/2011 | Norris et al. | |
| 7,987,676 B2 | 8/2011 | Ast et al. | |
| 8,177,884 B2 | 5/2012 | Schmidt et al. | |
| 8,261,528 B2 | 9/2012 | Chillar et al. | |
| 8,499,822 B2 | 8/2013 | Bulin et al. | |
| 8,522,572 B2 | 9/2013 | Coffinberry et al. | |
| 8,747,055 B2 | 6/2014 | McCune et al. | |
| 8,765,070 B2 | 7/2014 | Norton et al. | |
| 8,789,377 B1 | 7/2014 | Brostmeyer | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 9,014,791 B2 | 4/2015 | Held | |
| 9,038,397 B2 | 5/2015 | Papa et al. | |
| 9,120,580 B2 | 9/2015 | Sampath | |
| 9,127,566 B2 | 9/2015 | Suciu et al. | |
| 9,200,855 B2 | 12/2015 | Kington et al. | |
| 9,410,482 B2 | 8/2016 | Krautheim et al. | |
| 9,458,764 B2 | 10/2016 | Alecu et al. | |
| 9,567,095 B2 | 2/2017 | McCarthy et al. | |
| 9,580,185 B2 | 2/2017 | Rhoden et al. | |
| 2006/0093467 A1* | 5/2006 | Orlando .................. F02C 3/067 415/68 |
| 2008/0112798 A1* | 5/2008 | Seitzer .................... F01D 11/24 60/262 |
| 2009/0133380 A1 | 5/2009 | Donnerhack | |
| 2009/0188234 A1 | 7/2009 | Suciu et al. | |
| 2010/0212857 A1 | 8/2010 | Bulin et al. | |
| 2010/0313591 A1 | 12/2010 | Lents et al. | |
| 2012/0216502 A1 | 8/2012 | Freund et al. | |
| 2013/0186100 A1 | 7/2013 | Rhoden et al. | |
| 2013/0192238 A1 | 8/2013 | Munsell et al. | |
| 2013/0259687 A1 | 10/2013 | Suciu et al. | |
| 2013/0280028 A1 | 10/2013 | Benjamin et al. | |
| 2014/0165570 A1 | 6/2014 | Herring | |
| 2014/0205446 A1 | 7/2014 | Patsouris et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0114611 A1 | 4/2015 | Morris et al. | |
| 2016/0108814 A1 | 4/2016 | Schmitz | |
| 2016/0138478 A1 | 5/2016 | Negulescu | |
| 2016/0290214 A1 | 10/2016 | Ekanayake et al. | |
| 2016/0341126 A1 | 11/2016 | Kupratis et al. | |
| 2016/0369700 A1 | 12/2016 | Ribarov et al. | |
| 2016/0376891 A1 | 12/2016 | Bricaud et al. | |
| 2017/0030266 A1 | 2/2017 | Cerny et al. | |
| 2017/0044984 A1 | 2/2017 | Pesyna et al. | |
| 2017/0096945 A1 | 4/2017 | Mueller et al. | |
| 2017/0114721 A1 | 4/2017 | Miller et al. | |
| 2017/0159566 A1 | 6/2017 | Sennoun et al. | |
| 2017/0167382 A1 | 6/2017 | Miller et al. | |
| 2017/0184027 A1 | 6/2017 | Moniz et al. | |
| 2017/0370291 A1 | 12/2017 | Rambo | |
| 2018/0291744 A1 | 10/2018 | Devore et al. | |
| 2018/0354637 A1 | 12/2018 | Suciu et al. | |
| 2019/0063313 A1 | 2/2019 | Rez et al. | |
| 2019/0128137 A1* | 5/2019 | Wesling .................... F01D 5/06 |
| 2019/0153952 A1 | 5/2019 | Niergarth et al. | |
| 2019/0153953 A1 | 5/2019 | Niergarth et al. | |
| 2019/0218971 A1 | 7/2019 | Niergarth et al. | |
| 2019/0383219 A1 | 12/2019 | Johnson et al. | |

FOREIGN PATENT DOCUMENTS

| | | |
|---|---|---|
| EP | 3075957 A1 | 10/2016 |
| GB | 2034822 A | 6/1980 |
| GB | 2136880 A | 9/1984 |
| GB | 2204361 A | 11/1988 |
| JP | S5932893 U | 2/1984 |
| WO | WO02/16743 A1 | 2/2002 |
| WO | WO02/038938 A1 | 5/2002 |
| WO | WO2006/079438 A1 | 8/2006 |
| WO | WO2011/038188 A1 | 3/2011 |
| WO | WO2015/105552 A1 | 7/2015 |

* cited by examiner

US 11,976,562 B2

SYSTEM FOR CONTROLLING BLADE CLEARANCES WITHIN A GAS TURBINE ENGINE

CROSS REFERENCE TO RELATED APPLICATIONS

This application is a divisional of and claims the right of priority to U.S. patent application Ser. No. 17/142,357, filed Jan. 6, 2021, the disclosure of which is hereby incorporated by reference herein in its entirety for all purposes.

FIELD

The present disclosure generally pertains to gas turbine engines and, more particularly, to a system for controlling blade clearances within a gas turbine engine.

BACKGROUND

A gas turbine engine generally includes a compressor section, a combustion section, and a turbine section. During operation, the compressor section progressively increases the pressure of air entering the engine and supplies this compressed air to the combustion section. The compressed air and a fuel mix within the combustion section and burn within a combustion chamber to generate high-pressure and high-temperature combustion gases. The combustion gases flow through a hot gas path defined by the turbine section before exiting the engine. In this respect, the turbine section converts energy from the combustion gases into rotational energy. Specifically, the turbine section includes a plurality of rotor blades, which extract kinetic energy and/or thermal energy from the combustion gases flowing therethrough. The extracted rotational energy is, in turn, used to rotate one or more shafts, thereby driving the compressor section and/or a fan assembly of the gas turbine engine In general, it desirable to minimize the clearance between the outer tips of the rotor blades and the adjacent shrouds or drum to maximize the amount of energy extracted by the rotor blades. However, the rotor blades expand and contract relative to the shrouds/drum during thermal cycling of the engine. As such, the clearance between the rotor blades and the shrouds/drum generally decreases as the engine heats up. In this respect, when the clearance between the blade tips and the shrouds/drum is minimized during cold operation of the engine, the blade tips may contact the shrouds/drum when the engine heats up. Conversely, when the clearance between the blade tips and the shroud/drum is optimized for hot operation, such clearance may be sufficiently large to reduce the efficiency of the energy extraction during cold operation of the engine.

Accordingly, an improved system for controlling blade clearances within a gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a system for controlling blade clearances within a gas turbine engine. The gas turbine engine defines an axial centerline and a radial direction extending orthogonal to the axial centerline. The system includes a rotor disk and a rotor blade coupled to the rotor disk. Additionally, the system includes an outer turbine component positioned outward of the rotor blade in the radial direction such that a clearance is defined between the rotor blade and the outer turbine component. Furthermore, the system includes a heat exchanger configured to receive a flow of cooling air bled from the gas turbine engine and transfer heat from the received flow of the cooling air to a flow of coolant to generate cooled cooling air. Moreover, the system includes a valve configured to control the flow of the coolant to the heat exchanger. In this respect, the cooled cooling air is supplied to at least one of the rotor disk or the rotor blade to adjust the clearance between the rotor blade and the outer turbine component.

In another aspect, the present subject matter is directed to a system for controlling blade tip clearances within a gas turbine engine. The gas turbine engine defines an axial centerline and a radial direction extending orthogonal to the axial centerline. The system includes an inner rotor configured to rotate in a first direction and an inner rotor blade coupled to the inner rotor. Additionally, the system includes an outer rotating drum configured to rotate in a second direction opposite of the first direction and an outer rotor blade coupled to the outer rotating drum. Furthermore, the system includes heat exchanger configured to receive a flow of cooling air bled from the gas turbine engine and transfer heat from the received flow of the cooling air to a flow of coolant to generate cooled cooling air. In addition, the system includes a first air valve configured to direct a first portion of the cooled cooling air to the outer rotating drum and a second portion of the cooled cooling air to cool the inner rotor and a second air valve configured to direct a first portion of the cooling air to the outer rotating drum and a second portion of the cooling air to cool the inner rotor. As such, the cooled cooling air is supplied to at least one of the outer rotating drum or the inner rotor to adjust a first clearance defined between the inner rotor blade and the outer rotating drum and a second clearance between the outer rotor blade and the inner rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
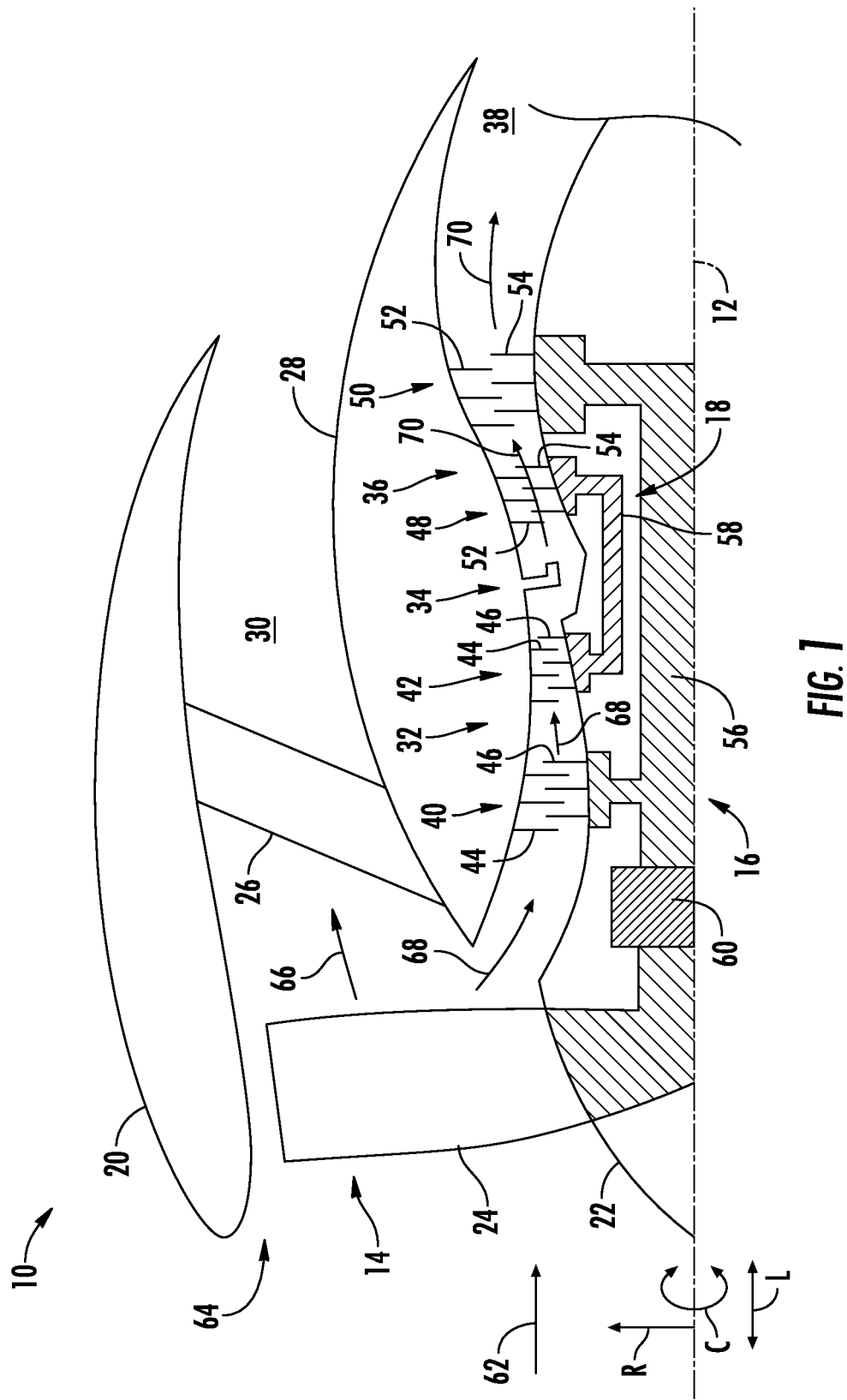
FIG. 1 is a schematic cross-sectional view of one embodiment of a gas turbine engine of an aircraft.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative parameter magnitudes (e.g., speeds, pressures, or temperatures) within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a system for controlling blade clearances within a gas turbine engine. As will be described below, the gas turbine engine includes a shaft, a rotor disk coupled to the shaft, and a rotor blade coupled to the rotor disk (e.g., via a dovetail connection) such that the rotor blade extends outward from the disk along a radial direction of the engine. Additionally, the gas turbine engine includes an outer turbine component, such as a shroud or a counter-rotating outer drum, positioned outward of the rotor blade in the radial direction. As such, a clearance is defined between the outer tip of the rotor blade and the outer turbine component.

The disclosed system is configured to supply cooled cooling air to the rotor disk and/or the rotor blade to adjust the clearance between the rotor blade and the outer turbine component. Specifically, the system includes a heat exchanger configured to receive a flow of cooling air bled from the gas turbine engine. For example, in one embodiment, the cooling air is bled from a compressor discharge plenum of the engine. As such, the heat exchanger is configured to transfer heat from the received flow of cooling air to a flow of coolant (e.g., supercritical carbon dioxide) to generate cooled cooling air. Additionally, the system includes a valve configured to control the flow of the coolant to the heat exchanger to adjust the temperature of the cooled cooling air. The cooled cooling air is, in turn, routed to the rotor disk and/or the rotor blade to adjust the clearance between the rotor blade and the outer turbine component. For example, in some embodiments, the cooled cooling air flows from the heat exchanger to the rotor disk and/or the rotor blade through a conduit at least partially positioned between the shaft and a combustor of the engine.

The disclosed system provides one or more technical advantages. For example, as described above, the disclosed system supplies cooled cooling air to the rotor disk and/or the rotor blade. Such cooled cooling air reduces the amount that rotor blade expands as the engine heats up, thereby controlling clearance between the rotor blade and outer turbine component. Furthermore, as mentioned above, the temperature of the cooled cooling air may be controlled by the valve. In this respect, increasing the amount of and/or decreasing the temperature of the cooled cooling air supplied to the rotor blade and/or the rotor disk may shrink the rotor blade and/or the disk, thereby increasing the clearance via a reduction in the blade tip radius. Conversely, the clearance may be decreased by reducing the amount of and/or increasing the temperature of cooling air supplied to the rotor blade and/or the rotor disk. Moreover, the disclosed system allows the thermal expansion/contraction of the rotor blade and/or the disk to be controlled independently of the thermal expansion/contraction of the outer turbine component.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38.

For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

Figure 2:
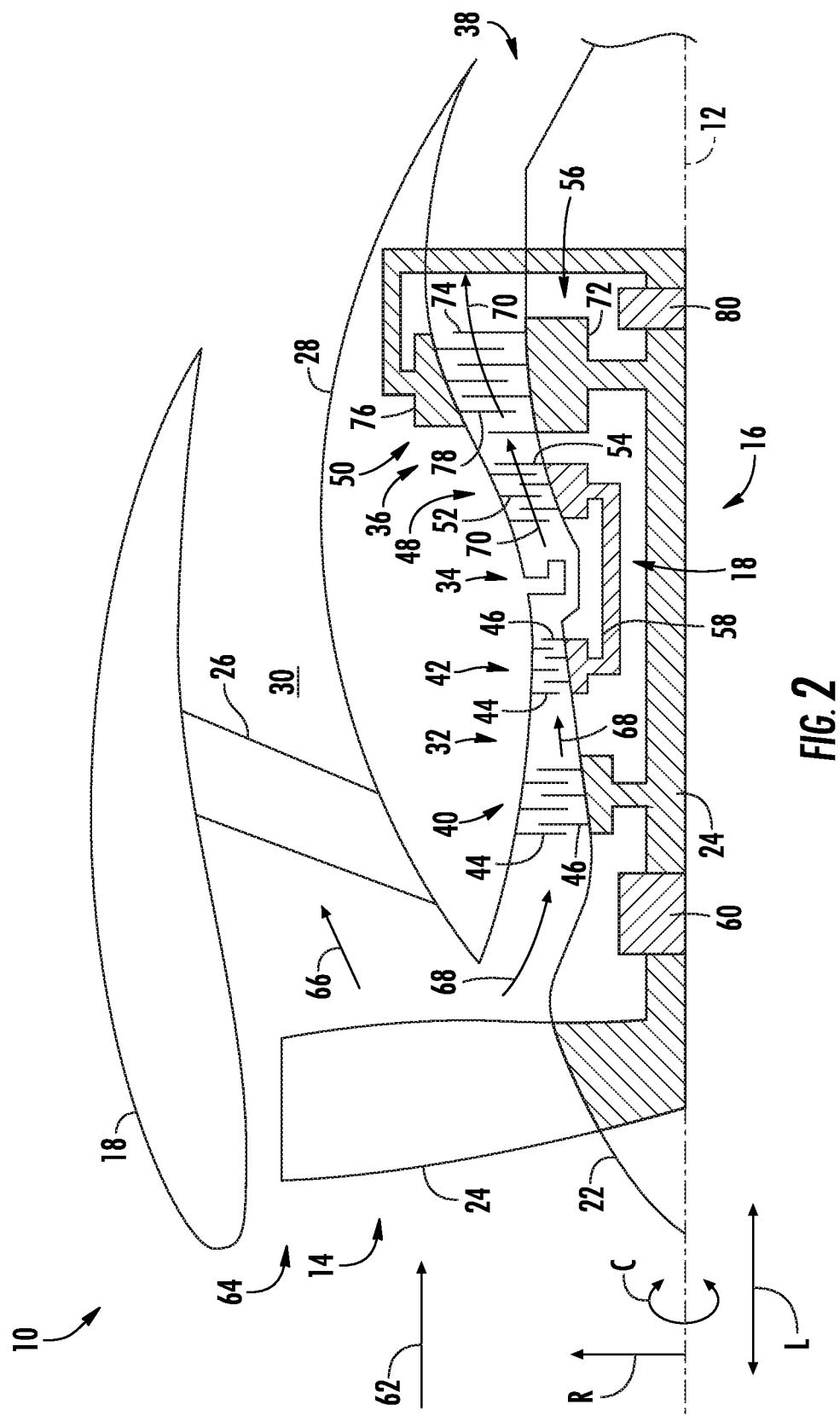
FIG. 2 is a schematic cross-sectional view of another embodiment of a gas turbine engine of an aircraft.

FIG. 2 is a schematic cross-sectional view of another embodiment of a gas turbine engine 10 of an aircraft. Like the embodiment of the engine 10 shown in FIG. 1, the embodiment of the engine 10 shown in FIG. 2 includes an LP turbine 50. However, unlike the embodiment of the engine 10 shown in FIG. 1, in the embodiment of the engine 10 shown in FIG. 2, the LP turbine 50 is a counter-rotating turbine. Specifically, in such an embodiment, the LP turbine 50 includes an inner rotor 72 configured to rotate in a first direction (e.g., one of the clockwise or counter-clockwise directions) and one or more rows of inner rotor blades 74 coupled to and extending outward from the inner rotor 72 in the radial direction R. Furthermore, in such an embodiment, the LP turbine 50 includes an outer rotating drum 76 configured to rotate in a second direction opposite of the first direction (e.g., the other of clockwise or counter-clockwise directions) and one or more rows of outer rotor blades 78 extending inward from the drum 102 toward the axial centerline 12 in the radial direction R. As shown, the rows of outer rotor blades 78 are interdigitated with the rows of inner rotor blades 74. In addition, the LP shaft 24 may be coupled to the outer rotor 76 of the LP turbine 50 via a gearbox 80.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
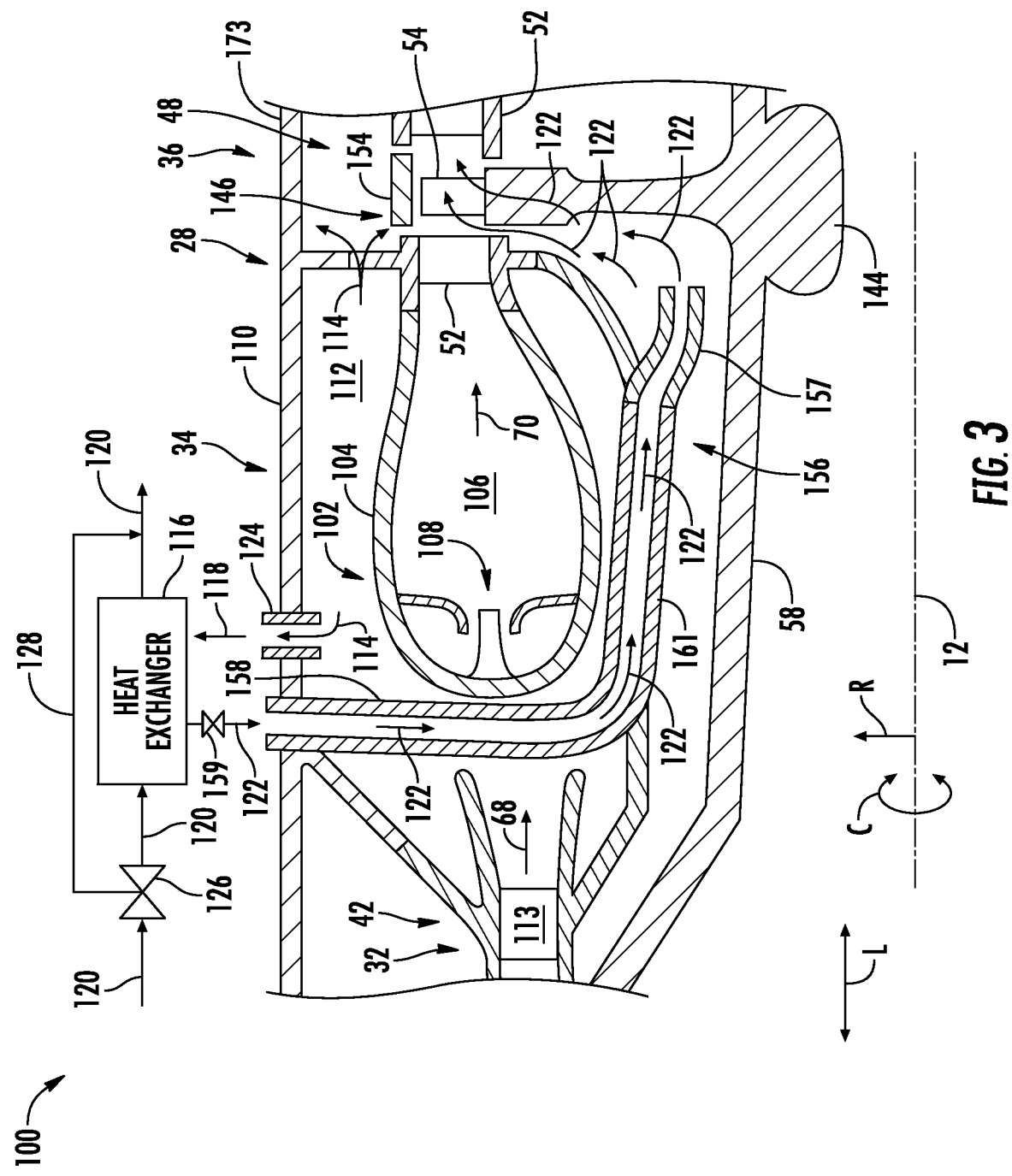
FIG. 3 is a schematic view of one embodiment of a system for controlling blade clearances within a gas turbine engine.

FIG. 3 illustrates one embodiment of a system 100 for controlling blade clearances within a gas turbine engine. In general, the system 100 will be discussed in the context of the gas turbine engine 10 described above and shown in FIGS. 1 and 2. However, the disclosed system 100 may be implemented within any gas turbine engine having any other suitable configuration.

As shown, in several embodiments, the combustion section 34 of the gas turbine engine 10 includes one or more combustors 102. In general, the combustor(s) 102 is positioned outward from the shafts 56, 58 along the radial direction R. Each combustor 102 includes a liner 104 defining a combustion chamber 106 therein. Moreover, each combustor 102 includes one or more fuel nozzles 108, which supply a mixture of fuel and compressed air (e.g., the compressed, the second portion 68 of the air 62) to the combustion chamber 106. The fuel and air mixture burns within the combustion chamber 106 to generate the high-temperature and high-pressure combustion gases 70. Although FIG. 3 illustrates a single combustor 102, the combustion section 34 may, in other embodiments, include a plurality of combustors 102.

Additionally, in several embodiments, the combustion section 34 includes a compressor discharge casing 110. In such embodiments, the compressor discharge casing 110 at least partially surrounds or otherwise encloses the combustor(s) 102 in the circumferential direction C. In this respect, a compressor discharge plenum 112 is defined between the compressor discharge casing 110 and the liner 104. The compressor discharge plenum 112 is, in turn, configured to supply compressed air to the combustor(s) 102. Specifically, as shown, the compressed air exiting the HP compressor 42 is directed into the compressor discharge plenum 112 by an inlet guide vane 113. The compressed air within the compressor discharge plenum 112 will be referred to as compressed air 114. A portion of the compressed air 114 is supplied to the combustion chamber(s) 106 of the combustor(s) 102 by the fuel nozzle(s) 108 for use in combusting the fuel. As will be described below, in some embodiments, another portion of the compressed air 114 is used for cooling components of the HP turbine 48 of the gas turbine engine 10.

As shown, the system 100 includes a heat exchanger 116. More specifically, the heat exchanger 116 is configured to receive a flow of cooling air (indicated by arrow 118) bled from the gas turbine engine 10 and a flow of coolant (indicated by arrows 120). In this respect, the heat exchanger 116 is configured to transfer heat from the flow of the cooling air 118 to the flow of coolant 120. Such heat transfer cools the received cooling air 118, thereby generating cooled cooling air (indicated by arrows 122). As will be described below, the temperature of the cooled cooling air 122 may be adjusted by controlling the volume of the coolant 120 flowing through the heat exchanger 116. Thereafter, the cooled cooling air 122 is routed to the turbine section 36 to control the blade tip clearances therein.

In several embodiments, the heat exchanger 116 is configured to receive the cooling air 118 from the compressor discharge plenum 112. Specifically, in such embodiments, a portion of the compressed air 114 is bled from the compressor discharge plenum 112 and routed to the heat exchanger 116. For example, in one embodiment, the system 100 includes a conduit 124 that conveys the compressed air 114 from the compressor discharge plenum 112 to the heat exchanger 116. Although not shown in FIG. 3, a suitable valve(s) may be provided in associated with the conduit 124 to control the flow of the compressed air 114 from the compressor discharge plenum 112 to the heat exchanger 116. However, in alternative embodiments, the cooling air 118 received by the heat exchanger 116 may be bled from any other suitable location on the gas turbine engine 10, such as the compressor section 32.

The heat exchanger 116 may be positioned at any suitable location within the gas turbine engine 10. For example, as shown, in one embodiment, the heat exchanger 116 is positioned outward along the radial direction R from the combustor(s) 102.

Additionally, the flow of coolant 120 received by the heat exchanger 116 may be formed from any suitable type of coolant. For example, in one embodiment, the flow of coolant 120 may be a flow of supercritical carbon dioxide.

As mentioned above, in some embodiments, the temperature of the cooled cooling air 122 may be adjusted by controlling the flow of the coolant 120 to the heat exchanger 116. In such embodiments, the system 100 includes a valve 126 configured to control the flow of the coolant 120 to the heat exchanger 116 and a bypass conduit 128. More specifically, the valve 126 is configured to adjust the volume of the coolant 120 supplied to the heat exchanger 116 by allowing a portion of the coolant to bypass the heat exchanger 116 via the bypass conduit 128. For example, the valve 126 may increase the volume of the coolant 120 supplied to the heat exchanger 116 by allowing less coolant 120 (or no coolant 120) to flow into the bypass conduit 128. Such an increase in the volume of the coolant 120 supplied to the heat exchanger 116 decreases the temperature of the cooled cooling air 122. Conversely, the valve 126 may decrease the volume of the coolant 120 supplied to the heat exchanger 116 by allowing more coolant 120 to flow into the bypass conduit 128. Such a decrease in the volume of the coolant 120 supplied to the heat exchanger 116 increases the temperature of the cooled cooling air 122.

Figure 4:
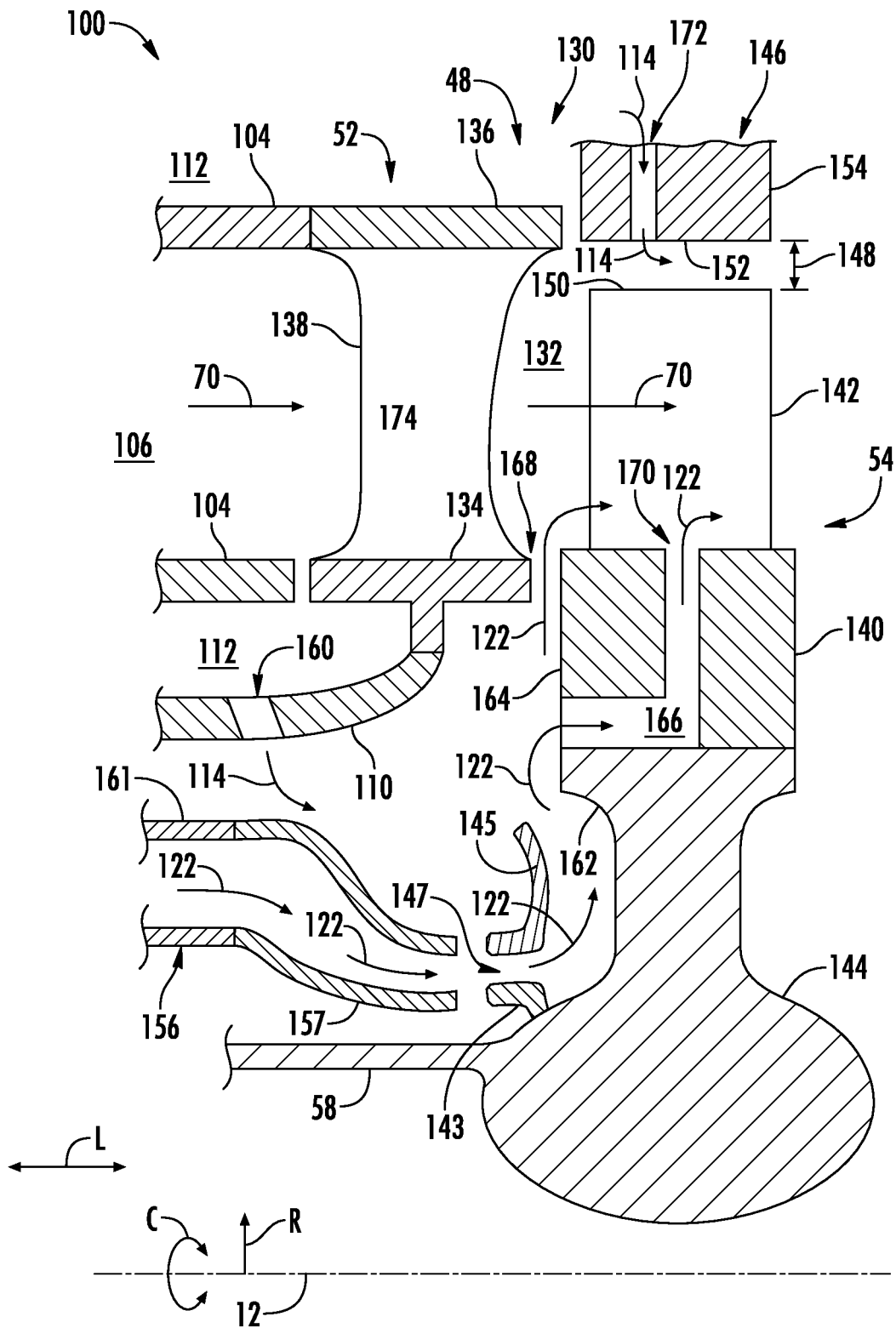
FIG. 4 is an enlarged, partial schematic view of the system for controlling blade clearances within a gas turbine engine shown in FIG. 3, particularly illustrating a rotor disk and a rotor blade of the gas turbine engine.

Referring now to FIGS. 3 and 4, the cooled cooling air 122 is routed to the turbine section 36 to control the blade tip clearances therein. In several embodiments, the cooled cooling air 122 may be used to control the blade tip clearances of a first stage 130 of the HP turbine 48. However, in alternative embodiments, the cooled cooling air 122 may be used to control the blade tip clearances of any other blade tips within the turbine section 36.

In general, the first stage 130 includes a row of circumferentially arranged stator vanes 52 (one is shown) and a row of circumferentially arranged rotor blades 54 (one is shown). As shown, the stator vanes 52 are positioned downstream from the combustion chamber 106 relative to the direction of the flow of the combustion gases 70. As such, the stator vanes 52 define a downstream end of the compressor discharge plenum 112. Furthermore, the rotor blades 54 are positioned downstream from the stator vanes 52 in the direction of the flow of the combustion gases 70. In this respect, the stator vanes 52 and rotor blades 52 partially form a hot gas path 132 along which the combustion gases 70 flow through the turbine section 36. More specifically, each stator vane 52 includes inner and outer bands 134, 136 respectively forming the inner and outer boundaries of the hot gas path 132 in the radial direction R. Each stator vane 54 also includes an airfoil 138 extending through the hot gas path 132 along the radial direction R between the inner and outer bands 134, 136. Moreover, each rotor blade 54 includes a base portion 140 and an airfoil 142 extending outward in the radial direction R from the base portion 140 into the hot gas path 132. The base portion 140 of each rotor blade 54 is coupled to a rotor disk 144 (e.g., via a dovetail connection, a fir tree-type connection, etc.), with the rotor disk 144, in turn, being coupled to the HP shaft 58. As such, rotation of the rotor disk 144 and the rotor blades 54 rotate the HP shaft 58, which, in turn, drives the compressor 32 as described above.

Moreover, in some embodiments, one or more seals may be positioned adjacent of the rotor disk 144. For example, as shown in FIG. 4, inner and outer seals 143, 145 are positioned upstream of the rotor disk 144 along the axial centerline 12 relative to the direction of the flow of the combustion gases 70 through the gas turbine engine 10. In such an embodiment, the inner seal 143 is positioned inward along the radial direction R of the outer seal 145 such that a gap 147 is defined therebetween. As will be described below, the cooled cooling air 122 may flow through the gap 147 toward the rotor disk 144 and then outward along the radial direction R between the outer seal 145 and the rotor disk 144, thereby cooling the rotor disk 144 and the rotor blade 54.

Additionally, the first stage 130 of the HP turbine 48 includes one or more outer turbine components 146 partially defining the hot gas path 132. In general, the outer turbine component(s) 146 is positioned outward of airfoil 142 of the rotor blade 54 in the radial direction R such that the component(s) 146 define an outer boundary of the hot gas path 132 in the radial direction R. As shown, a clearance (indicated by arrow 148) is defined between the tips 150 of the airfoils 142 of the rotor blades 54 and an inner radial surface(s) 152 of the outer turbine component(s) 146. As will be described below, the clearance 148 may be controlled by the cooled cooling air 122 supplied to the first stage 130. For example, in the illustrated embodiment, the outer turbine component(s) 146 is a shroud 154 enclosing the rotor blades 54. However, in alternative embodiments, the outer turbine component(s) 146 may be any other suitable component(s), such as a counter-rotating drum (e.g., the outer rotating drum 76) or a shroud attached to a counter-rotating drum.

Furthermore, in several embodiments, the system 100 includes a conduit 156. In general, the conduit 156 is configured to supply the cooled cooling air 122 from the heat exchanger 116 to the rotor blades 54 and the rotor disk 144 of the first stage 130. As such, in some embodiments, the conduit 156 is at least partially positioned between the combustor(s) 102 (and, more specifically, the inner portion of the compressor discharge casing 110 in the radial direction R) and the HP shaft 58 in the radial direction R. Additionally, in some embodiments, the system 100 includes an inducer 157 configured to direct the cooled cooling air flowing through the conduit 156 toward the rotor disk 144.

For example, as shown, in one embodiment, the inducer 157 narrows as the inducer 157 extends from the downstream end of the conduit 156 toward the rotor disk 144 to direct the cooled cooling air 122 through the gap 147.

The conduit 156 may have any suitable configuration for routing the cooled cooling air 122 to the rotor disk 144 and/or the rotor blade 54. For example, as mentioned above, in the illustrated embodiment, the heat exchanger 116 is positioned outward from the combustor(s) 102 in the radial direction R. In such an embodiment, the conduit includes a first portion 158 extending along the radial direction R from the heat exchanger 116 inward toward the axial centerline 12. In one embodiment, the first portion 158 of the conduit 156 is positioned upstream of the combustor(s) 102 relative to the direction of flow of the combustion gases 70 through the gas turbine engine 10. In addition, in several embodiments, the system 100 includes a valve 159 configured to control the flow of the cooled cooling air 122 from the heat exchanger 116 to the cooling passage 156. Furthermore, the conduit 156 includes a second portion 161 extending from the downstream end of the first portion 158 along the axial centerline 12 between the HP shaft 58 and the combustor 102 toward the rotor disk 144. As indicated above, the inducer 157 is positioned at the downstream end of the second portion 161 to direct the cooled cooling air 121 exiting the conduit 156 through the gap 147 and toward the rotor disk 144. However, in alternative embodiments, the conduit 156 may have any other suitable configuration.

In some embodiments, the flow of cooled cooling air 122 supplied to the rotor disk 144 and/or the rotor blade 54 by the conduit 156 is supplemented with additional compressed air 114 from the compressor discharge plenum 112. More specifically, as shown in FIG. 4, in such embodiments, the inner radial side of the compressor discharge casing 110 defines a bleed port 160 fluidly coupling the compressor discharge plenum 112 and the cooling passage 156. In this respect, a portion of the compressed air 114 from the compressor discharge plenum 112 flows through the bleed port 160 and directly into the cooling passage 156. This additional compressed air 114 may increase the volume of the cooling air 122 supplied to the turbine section 36, thereby increasing the cooling capacity of such air 122 without increasing the size of the heat exchanger 116. In one embodiment, a valve (not shown) may control the flow the additional compressed air 114 through the bleed port 160.

Referring particularly to FIG. 4, in several embodiments, the cooled cooling air 122 flowing through the conduit 156 is supplied to the rotor disk 144 and the rotor blades 54 of the first stage 130 of the HP turbine 48. More specifically, the cooled cooling air 122 flows inward along the radial direction R from the heat exchanger 116 through the first portion 158 of the conduit 156 and subsequently downstream relative to the direction of flow of the combustion gases 70 through the second portion 161 of the conduit 156. The inducer 157 then directs the cooled cooling air 122 exiting the conduit 156 through the gap 147 between the seals 143, 145 and onto the rotor disk 144 of the first stage 130. The cooled cooling air 122 then flows outward in the radial direction R between the outer seal 145 and a forward or upstream surface 162 of the rotor disk 144 such that the cooled cooling air 122 cools the disk 144. Thereafter, the cooled cooling air 122 flows along forward or upstream surfaces 164 of the the base portions 140 of the first stage rotor blades 54. In one embodiment, a portion of the cooled cooling air 122 flows through passages 166 (one is shown) defined by the base portions 140 of the first stage rotor blades 54, thereby cooling the interiors of the rotor blades 54.

As indicated above, the cooled cooling air 122 allows the clearance 148 between the rotor blade tips 150 and the outer turbine component(s) 146 to be controlled. More specifically, the cooling of the first stage rotor disk 144 and rotor blades 54 provided by the cooled cooling air 122 causes the disk 144 and the rotor blades 54 to shrink in the radial direction R. In this respect, increasing the amount of and/or decreasing the temperature (e.g., by controlling the valve 126) of the cooled cooling air 122 supplied to the rotor disk 144 and the rotor blades 54 increases the amount such components shrink, thereby increasing the clearance 152. Conversely, decreasing the amount of and/or increasing the temperature (e.g., by controlling the valve 126) of the cooled cooling air 122 supplied to the rotor disk 144 and the rotor blades 54 causes the components to grow, thereby decreasing the clearance 152. As such, the disclosed system 100 allows the clearance 148 to be minimized as the temperature of the gas turbine engine 10 varies during operation.

After cooling the first stage rotor disk 144 and rotor blades 54, the spent cooled cooling air 122 may be exhausted into the hot gas path 132. For example, in some embodiments, at least a portion of the spent cooled cooling air 122 may flow along the upstream surfaces 164 of the rotor blades 54 and be exhausted in the hot gas path through a clearance 168. The clearance 168 is, in turn, defined between the inner bands 134 of the stator vanes 52 and the platforms of the rotor blades 54. Moreover, in some embodiments, at least a portion of the spent cooled cooling air 122 may flow through the passages 166 in the base portions 140 of the first stage rotor blades 54 and be exhausted in the hot gas path through an outlet 170. However, in alternative embodiments, the spent cooled cooling air 122 may be exhausted into the hot gas path 132 in any other suitable manner.

In several embodiments, the first stage outer turbine component(s) 146 are cooled in a controlled manner to further control the size of the clearance 148 between the outer turbine component(s) 146 and the rotor blade tips 150. Specifically, in such embodiments, compressed air 114 from the compressor discharge plenum 112 is supplied to the outer turbine component(s) 146 to cool this component(s) 146, thereby shrinking the component(s) 146. Shrinking the outer turbine component(s) 146, in turn, decreases the clearance 148. For example, in one embodiment, the shroud 154 (e.g., a 360-degree shroud) defines a passage 172 through which the compressed air 114 flows to the cool the shroud 154. However, in other embodiments, the compressed air 114 may be simply directed at the outer radial side the outer turbine component(s) 146. Furthermore, the compressed air 114 may be supplied to a turbine case 173 to which the outer turbine component(s) 146 is coupled to adjust the clearance between the rotor blade tip(s) 150 and the outer turbine component(s) 146. After cooling the outer turbine component(s) 146, the spent compressed air 114 may be exhausted into the hot gas path 132. In other embodiments, the air supplied to cool the outer turbine components, such as a 360-degree ring shroud or a counter-rotating drum (with or without attached segmented shrouds), may be cooled cooling air cooled by an independent heat exchanger having a coolant (e.g., supercritical CO2) which is controlled by an independent valve. This cooled cooling air 122 used to cool the outer turbine components may also be controlled or metered using an in-line air valve, such as the valve 159.

The flow of the cooled cooling air 122 to the first stage rotor disk 144 and the rotor blades 54 may be controlled independently of the flow of the compressed air 114 or cooled cooling air 122 to the outer turbine component(s) 146. As such, the clearance 148 between the outer turbine component(s) 146 and rotor blade tips 150 may be adjusted by controlling the flow and temperature of the cooled cooling air 122 to the first stage rotor disk 144 and the rotor blades 54, the flow of the compressed air 114 or the flow and temperature of the cooled cooling air 122 to the outer turbine component(s) 146, or both.

Figure 5:
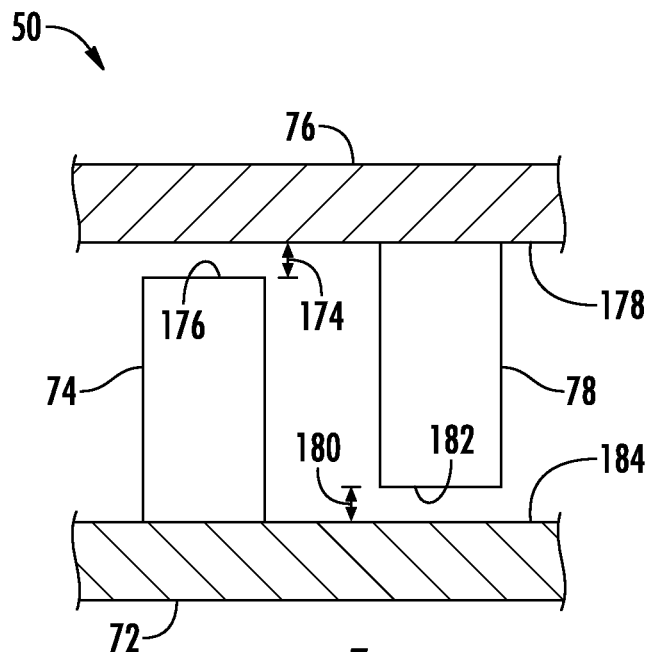
FIG. 5 is a cross-sectional side view of one embodiment of a turbine section of a gas turbine engine.

Additionally, in some embodiments, the system 100 may be used to control the sizes of the clearances in counter-rotating turbines. More specifically, as shown in FIG. 5, in such a turbine (e.g., the LP turbine 50 shown in FIG. 2), a first clearance (indicated by arrow 174) is defined between the tips 176 of the airfoils of the inner rotor blades 74 and an inner radial surface(s) 178 of the outer rotating drum 76. Moreover, a second clearance (indicated by arrow 180) is defined between the tips 182 of the airfoils of the outer rotor blades 78 and an outer radial surface(s) 184 of the inner rotor 72.

Figure 6:
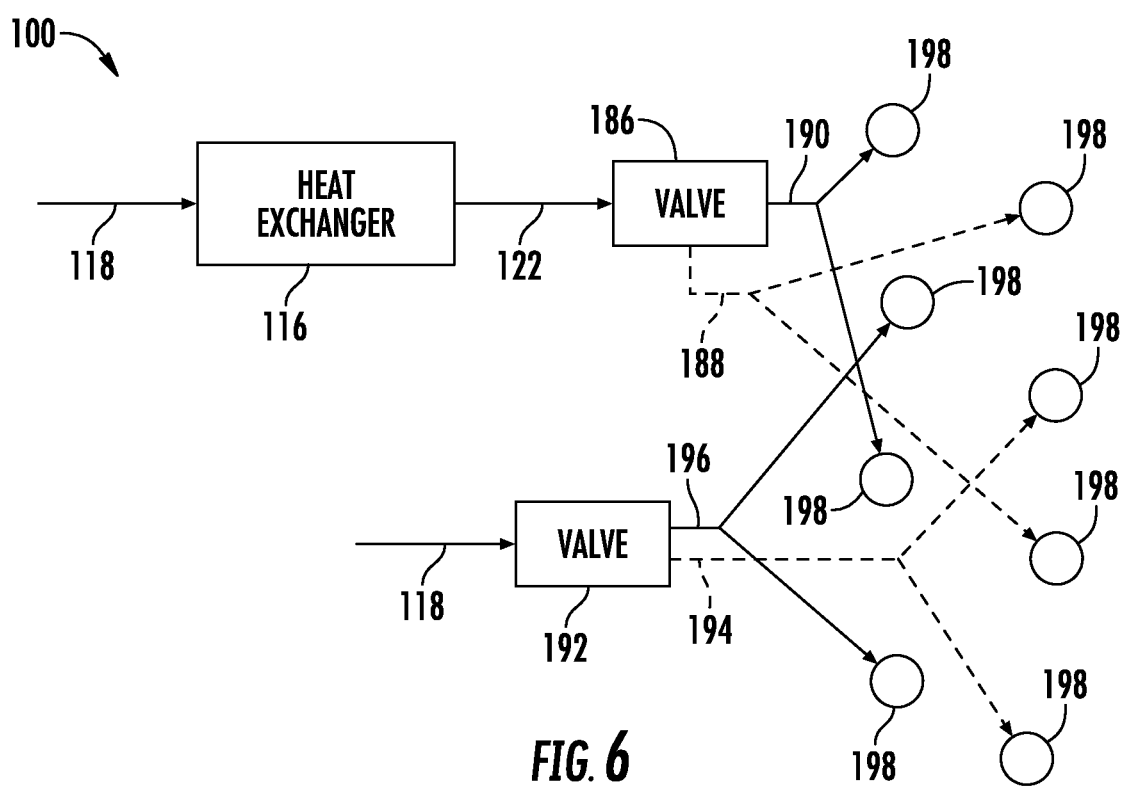
FIG. 6 is a schematic view of another embodiment of a system for controlling blade clearances within a gas turbine engine.

FIG. 6 is a schematic view of another embodiment of a system 100 for controlling blade clearances within a gas turbine engine. Like the embodiment of the system 100 shown in FIGS. 3 and 4, the system 100 shown in FIG. 6 includes a heat exchanger 116 configured to receive and cool cooling air 118 to generate cooled cooling air 122. However, unlike the embodiment of the system 100 shown in FIGS. 3 and 4, the system 100 shown in FIG. 6 includes a first air valve 186 in fluid communication with the heat exchanger 116. In this respect, the first air valve 186 is configured to direct or otherwise route a first portion 188 of the cooled cooling air 122 from the heat exchanger 116 to the outer rotating drum 76 and a second portion 190 of the cooled cooling air 122 from the heat exchanger 116 to cool the inner rotor 72. Furthermore, unlike the embodiment of the system 100 shown in FIGS. 3 and 4, the system 100 shown in FIG. 6 includes a second air valve 192 configured to route a first portion of cooling air 118 (e.g., cooling air 118 bled from the compressor discharge plenum 112, but not delivered to the heat exchanger 116) to the outer rotating drum 76 and a second portion 196 of the cooling air 118 to cool the inner rotor 72.

As indicated above, the cooling air 118 and the cooled cooling air 122 allow the first and second clearances 174 and 180 to be controlled. More specifically, the cooling of the inner rotor 72 and the outer rotating drum 76 provided by the cooling air 118 and the cooled cooling air 122 causes the inner rotor 72 and the outer rotating drum 76 to shrink in the radial direction R. In this respect, increasing the amount of cooled cooling air 122 and the decreasing the amount of cooled air 118 (e.g., by controlling the valves 186, 192) supplied to the inner rotor 72 and the outer rotating drum 76 increases the amount such components shrink, thereby increasing the clearance 174, 180. Conversely, decreasing the amount of cooled cooling air 122 and the increasing the amount of cooled air 118 (e.g., by controlling the valves 186, 192) supplied to the inner rotor 72 and the outer rotating drum 76 causes the components to grow, thereby decreasing the clearance 152. As such, the disclosed system 100 allows the clearances, 174, 180 to be minimized as the temperature of the gas turbine engine 10 varies during operation.

Figure 7:
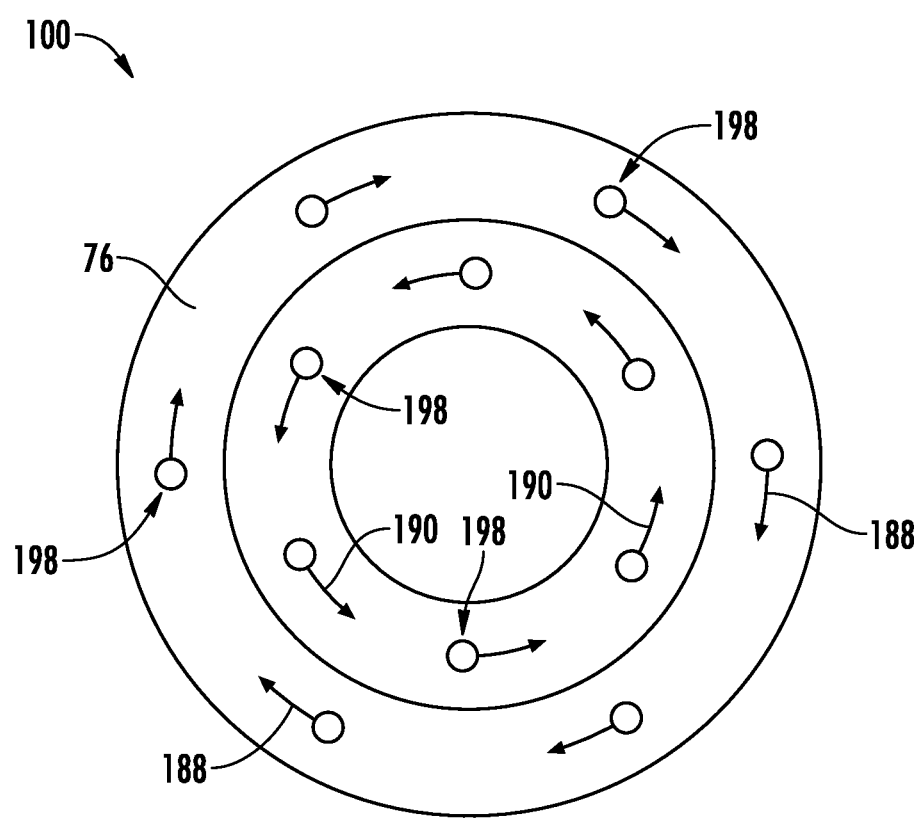
FIG. 7 is another schematic view of the system shown in FIG. 6.

As shown in FIGS. 6 and 7, the cooled cooling air 122 and the cooling air 118 are delivered to the outer rotating drum 76 and the inner rotor 72 via angled nozzles 198 to further affect the cooling of the outer rotating drum 76 and the inner rotor 72. More specifically, the first portion 188 of the cooled cooling air 122 may be introduced to or otherwise directed at the outer rotating drum 76 through one or more angled nozzles 198 such that a tangential component of the velocity of the first portion 188 of the cooled cooling air 122 is in the second direction (i.e., the direction in which the outer rotating drum 76 rotates). Furthermore, the second portion 190 of the cooled cooling air 122 may be introduced to or otherwise directed at the inner rotor 72 through one or more angled nozzles 198 such that a tangential component of the velocity of the second portion 190 of the cooled cooling air 122 is in the first direction (i.e., the direction in which the inner rotor 72 rotates). Directing the cooled cooling air 122 in the same direction as the rotation of the inner rotor 72 and the outer rotating drum 76 increases the cooling that the cooled cooling air 122 provides. Conversely, the first portion 194 of the cooling air 118 may be introduced to or otherwise directed at the outer rotating drum 76 through one or more angled nozzles 198 such that a tangential component of the velocity of the first portion 194 of the cooling air 118 is in the first direction (i.e., the opposite direction to which the outer rotating drum 76 rotates). Moreover, the second portion 196 of the cooling air 118 may be introduced to or otherwise directed at the inner rotor 72 through one or more angled nozzles 198 such that a tangential component of the velocity of the second portion 196 of the cooling air 118 is in the second direction (i.e., the opposite direction in which the inner rotor 72 rotates). Directing the cooled cooling air 122 in the opposite direction as the rotation of the inner rotor 72 and the outer rotating drum 76 decreases the cooling that the cooled cooling air 122 provides. In this respect, the controlling the amount of cooling air 118 and the cooled cooling air 122 (e.g., with the valves 186, 192) and its direction of flow relative to the inner rotor 72 and the outer rotating drum 76 (e.g., via the nozzles 198), the clearances, 174, 180 to be minimized as the temperature of the gas turbine engine 10 varies during operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A system for controlling blade clearances within a gas turbine engine, the gas turbine engine defining an axial centerline and a radial direction extending orthogonal to the axial centerline, the system comprising: a rotor disk; a rotor blade coupled to the rotor disk; an outer turbine component positioned outward of the rotor blade in the radial direction such that a clearance is defined between the rotor blade and the outer turbine component; a heat exchanger configured to receive a flow of cooling air bled from the gas turbine engine and transfer heat from the received flow of the cooling air to a flow of coolant to generate cooled cooling air; and a valve configured to control the flow of the coolant to the heat exchanger, wherein the cooled cooling air is supplied to at least one of the rotor disk or the rotor blade to adjust the clearance between the rotor blade and the outer turbine component.

The system of one or more of these clauses, further comprising: a shaft coupled to the rotor disk such that rotation of the rotor disk and the rotor blade rotates the shaft; a combustor positioned outward in the radial direction from the shaft; and a conduit at least partially positioned between the shaft and the combustor in the radial direction such that the cooled cooling air flows through the cooling passage from the heat exchanger to the at least one of the rotor disk or the rotor blade.

The system of one or more of these clauses, further comprising: an inducer configured to direct the cooled cooling air flowing through the conduit toward the rotor disk.

The system of one or more of these clauses, wherein the inducer narrows as the inducer extends from the conduit toward the rotor disk.

The system of one or more of these clauses, further comprising: a seal positioned upstream of the rotor disk along the axial centerline relative to a direction of flow through the gas turbine engine, wherein the inducer directs the cooled cooling air such that the cooled cooling air flows between the rotor disk and the seal.

The system of one or more of these clauses, wherein the seal corresponds to an outer seal, the system further comprising: an inner seal positioned inward along the radial direction relative to the outer seal such that a gap is defined between the inner and outer seals through which the cooled cooling air flows from the inducer toward the rotor disk.

The system of one or more of these clauses wherein the conduit includes a first portion extending along the radial direction from the heat exchanger and a second portion extending along the axial centerline from the first portion toward the rotor disk.

The system of one or more of these clauses, wherein the first portion of the conduit is positioned upstream of the combustor relative to a direction of flow through the gas turbine engine.

The system of one or more of these clauses, wherein the heat exchanger is positioned outward along the radial direction from the combustor.

The system of one or more of these clauses, further comprising: a compressor discharge casing at least partially surrounding the combustor, the compressor discharge casing defining a compressor discharge plenum configured to supply compressed air to the combustor, wherein the cooling air received by the heat exchanger is bled from the compressor discharge plenum.

The system of one or more of these clauses, further comprising: a turbine case coupled to the outer turbine components, wherein the cooled cooling air is supplied to the turbine case to adjust the clearance between the rotor blade and the outer turbine component.

The system of one or more of these clauses, further comprising: a bypass conduit fluidly coupled to the valve such that the bypass conduit is configured to permit at least a portion of the coolant to bypass the heat exchanger.

The system of one or more of these clauses, wherein the cooled cooling air is discharged into a hot gas path at least partially defined by the rotor blade and the outer turbine component after being supplied to the at least one of the rotor disk or the rotor blade.

The system of one or more of these clauses, wherein the coolant comprises supercritical carbon dioxide.

The system of one or more of these clauses, wherein the outer turbine component comprises a shroud or an outer rotating drum.

A system for controlling blade tip clearances within a gas turbine engine, the gas turbine engine defining an axial centerline and a radial direction extending orthogonal to the axial centerline, the system comprising: an inner rotor configured to rotate in a first direction; an inner rotor blade coupled to the inner rotor; an outer rotating drum configured to rotate in a second direction opposite of the first direction; an outer rotor blade coupled to the outer rotating drum; a heat exchanger configured to receive a flow of cooling air bled from the gas turbine engine and transfer heat from the received flow of the cooling air to a flow of coolant to generate cooled cooling air; a first air valve configured to direct a first portion of the cooled cooling air to the outer rotating drum and a second portion of the cooled cooling air to cool the inner rotor; and a second air valve configured to direct a first portion of the cooling air to the outer rotating drum and a second portion of the cooling air to cool the inner rotor, wherein the cooled cooling air is supplied to at least one of the outer rotating drum or the inner rotor to adjust a first clearance defined between the inner rotor blade and the outer rotating drum and a second clearance between the outer rotor blade and the inner rotor.

The system of one or more of these clauses, where the first portion of the cooled cooling air is introduced to the outer rotating drum through an angled nozzle such that a tangential component of a velocity of the first portion of the cooled cooling air is in the second direction.

The system of one or more of these clauses, where the second portion of the cooled cooling air is introduced to the inner rotor through an angled nozzle such that a tangential component of a velocity of the second portion of the cooled cooling air is in the first direction.

The system of one or more of these clauses, where the first portion of the cooling air is introduced to outer rotating drum through an angled nozzle such that a tangential component of a velocity of the first portion of the cooling air is in the first direction.

The system of one or more of these clauses, where the second portion of the cooling air is introduced to inner rotor through an angled nozzle such that a tangential component of a velocity of the second portion of the cooling air is in the second direction.

What is claimed is:

1. A system for controlling blade tip clearances within a gas turbine engine, the gas turbine engine defining an axial centerline and a radial direction extending orthogonal to the axial centerline, the system comprising:
    an inner rotor configured to rotate in a first direction;
    an inner rotor blade coupled to the inner rotor;
    an outer rotating drum configured to rotate in a second direction opposite of the first direction;
    an outer rotor blade coupled to the outer rotating drum;
    a heat exchanger configured to receive a first flow of cooling air bled from the gas turbine engine and transfer heat from the received flow of the cooling air to a flow of coolant to generate cooled cooling air;
    a first air valve configured to direct a first portion of the cooled cooling air to the outer rotating drum and a second portion of the cooled cooling air to cool the inner rotor; and
    a second air valve configured to direct a first portion of a second flow of the cooling air to the outer rotating drum and a second portion of the second flow of the cooling air to cool the inner rotor,
    wherein the cooled cooling air is supplied to at least one of the outer rotating drum or the inner rotor to adjust a first clearance defined between the inner rotor blade and the outer rotating drum and a second clearance between the outer rotor blade and the inner rotor.

2. The system of claim 1, further comprising: an angled nozzle configured to supply the cooling air or the cooled cooling air to the outer rotating drum or the inner rotor such that the cooling air or the cooled cooling air is directed in one of the first direction or the second direction relative to the outer rotating drum or the inner rotor.

3. The system of claim 1, where the first portion of the cooled cooling air is introduced to the outer rotating drum through an angled nozzle such that a tangential component of a velocity of the first portion of the cooled cooling air is in the second direction.

4. The system of claim 1, where the second portion of the cooled cooling air is introduced to the inner rotor through an angled nozzle such that a tangential component of a velocity of the second portion of the cooled cooling air is in the first direction.

5. The system of claim 1, where the first portion of the cooling air is introduced to the outer rotating drum through an angled nozzle such that a tangential component of a velocity of the first portion of the cooling air is in the first direction.

6. The system of claim 1, where the second portion of the cooling air is introduced to the inner rotor through an angled nozzle such that a tangential component of a velocity of the second portion of the cooling air is in the second direction.

7. The system of claim 1, further comprising:
a combustor;
a compressor discharge casing at least partially surrounding the combustor, the compressor discharge casing defining a compressor discharge plenum configured to supply compressed air to the combustor,
wherein the first flow of the cooling air received by the heat exchanger is bled from the compressor discharge plenum.

8. The system of claim 7, wherein the second flow of the cooling air is bled from the compressor discharge plenum.

9. The system of claim 8, wherein the second flow of cooling air bypasses the heat exchanger.

10. The system of claim 1, wherein the coolant comprises supercritical carbon dioxide.

11. A gas turbine engine defining an axial centerline and a radial direction extending orthogonal to the axial centerline, the gas turbine engine comprising:
a compressor section;
a combustor;
a turbine section comprising:
an inner rotor configured to rotate in a first direction;
an inner rotor blade coupled to the inner rotor;
an outer rotating drum configured to rotate in a second direction opposite of the first direction; and
an outer rotor blade coupled to the outer rotating drum;
a heat exchanger configured to receive a first flow of cooling air bled from the gas turbine engine and transfer heat from the received flow of the cooling air to a flow of coolant to generate cooled cooling air;
a first air valve configured to direct a first portion of the cooled cooling air to the outer rotating drum and a second portion of the cooled cooling air to cool the inner rotor; and
a second air valve configured to direct a first portion of a second flow of the cooling air to the outer rotating drum and a second portion of the second flow of the cooling air to cool the inner rotor,
wherein the cooled cooling air is supplied to at least one of the outer rotating drum or the inner rotor to adjust a first clearance defined between the inner rotor blade and the outer rotating drum and a second clearance between the outer rotor blade and the inner rotor.

12. The gas turbine engine of claim 11, further comprising: an angled nozzle configured to supply the cooling air or the cooled cooling air to the outer rotating drum or the inner rotor such that the cooling air or the cooled cooling air is directed in one of the first direction or the second direction relative to the outer rotating drum or the inner rotor.

13. The gas turbine engine of claim 11, where the first portion of the cooled cooling air is introduced to the outer rotating drum through an angled nozzle such that a tangential component of a velocity of the first portion of the cooled cooling air is in the second direction.

14. The gas turbine engine of claim 11, where the second portion of the cooled cooling air is introduced to the inner rotor through an angled nozzle such that a tangential component of a velocity of the second portion of the cooled cooling air is in the first direction.

15. The gas turbine engine of claim 11, where the first portion of the cooling air is introduced to the outer rotating drum through an angled nozzle such that a tangential component of a velocity of the first portion of the cooling air is in the first direction.

16. The gas turbine engine of claim 11, where the second portion of the cooling air is introduced to the inner rotor through an angled nozzle such that a tangential component of a velocity of the second portion of the cooling air is in the second direction.

17. The gas turbine engine of claim 11, further comprising:
a compressor discharge casing at least partially surrounding the combustor, the compressor discharge casing defining a compressor discharge plenum configured to supply compressed air to the combustor,
wherein the first flow of the cooling air received by the heat exchanger is bled from the compressor discharge plenum.

18. The gas turbine engine of claim 17, wherein the second flow of the cooling air is bled from the compressor discharge plenum.

19. The gas turbine engine of claim 18, wherein the second flow of cooling air bypasses the heat exchanger.

20. The gas turbine engine of claim 11, wherein the coolant comprises supercritical carbon dioxide.

* * * * *